United States Patent
Yokawa et al.

(10) Patent No.: US 11,926,217 B2
(45) Date of Patent: Mar. 12, 2024

(54) PENDULUM TYPE MOUNT SYSTEM

(71) Applicant: Nissan Motor Co., Ltd., Kanagawa (JP)

(72) Inventors: Manabu Yokawa, Kanagawa (JP); Keisuke Oba, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 17/629,092

(22) PCT Filed: Jan. 19, 2021

(86) PCT No.: PCT/JP2021/001696
§ 371 (c)(1),
(2) Date: Jan. 21, 2022

(87) PCT Pub. No.: WO2022/157833
PCT Pub. Date: Jul. 28, 2022

(65) Prior Publication Data
US 2024/0034143 A1  Feb. 1, 2024

(51) Int. Cl.
*B60K 5/12* (2006.01)
*B60K 5/04* (2006.01)
*F02B 75/20* (2006.01)
*F02B 75/18* (2006.01)

(52) U.S. Cl.
CPC ............ *B60K 5/1241* (2013.01); *B60K 5/04* (2013.01); *B60K 5/1291* (2013.01); *F02B 75/20* (2013.01); *F02B 2075/1812* (2013.01)

(58) Field of Classification Search
CPC ...... B60K 5/1241; B60K 5/04; B60K 5/1291; F02B 75/20; F02B 2075/1812
See application file for complete search history.

(56) References Cited

U.S. PATENT DOCUMENTS

| | | | |
|---|---|---|---|
| 7,232,005 B2 * | 6/2007 | Komatsu | B62D 21/11 267/293 |
| 8,839,899 B2 * | 9/2014 | Kim | B60K 5/1216 180/300 |
| 9,193,250 B2 * | 11/2015 | Kim | B60K 5/1241 |
| 10,807,455 B2 * | 10/2020 | Kim | F16F 15/08 |

(Continued)

FOREIGN PATENT DOCUMENTS

| JP | 2004155323 A | 6/2004 |
|---|---|---|
| JP | 2006175894 A | 7/2006 |

(Continued)

*Primary Examiner* — John D Walters
(74) *Attorney, Agent, or Firm* — Osha Bergman Watanabe & Burton LLP

(57) ABSTRACT

A pendulum type mount system includes a pair of upper mounts that mount upper portions of a powerplant unit on a vehicle body, and a pair of first and second lower torque rods. The first and second lower torque rods are located on opposite sides to each other with respect to a reference plane including a gravity center of the powerplant unit. A first spring constant of the first lower torque rod is not smaller than a second spring constant of the second lower torque rod. A distance between a first plane including the first lower torque rod and the reference plane is not larger than a distance between a second plane including the second lower torque rod and the reference plane.

4 Claims, 4 Drawing Sheets

(56) References Cited

U.S. PATENT DOCUMENTS

| | | |
|---|---|---|
| 2004/0124034 A1 | 7/2004 | Komatsu et al. |
| 2013/0068552 A1 | 3/2013 | Kim et al. |

FOREIGN PATENT DOCUMENTS

| | | |
|---|---|---|
| JP | 2006205905 A | 8/2006 |
| JP | 2011093447 A | 5/2011 |
| JP | 201367368 A | 4/2013 |
| JP | 2013180744 A | 9/2013 |
| JP | 2014034319 A | 2/2014 |
| JP | 2020197271 A | 12/2020 |

\* cited by examiner

PENDULUM TYPE MOUNT SYSTEM

TECHNICAL FIELD

The present invention relates to a pendulum type mount system for a powerplant unit installed on a vehicle.

BACKGROUND ART

A powerplant unit that generates a drive force for running a vehicle is mounted in an engine compartment or a motor compartment. There are several kinds of mounting types of a powerplant unit on a vehicle body, but, in a pendulum type mount system, upper left and right portions of the powerplant unit is mounted on the vehicle body so as to hang down the powerplant unit. Reactive torques from tires and drive shafts act on the hung-down powerplant unit, and thereby it swings while its upper mounts function as support points. Therefore, a member called as a torque rod is attached to a lower portion of the powerplant unit in order to restrict this swinging. One end of the torque rod is attached to the lower portion of the powerplant unit, and the other end thereof is attached to the vehicle body on a rear side of the powerplant unit.

In the powerplant unit provided with an internal combustion engine (ICE), the ICE inevitably becomes a source of vibrations, so insulators are embedded in engine mounts, such as the upper mounts and the lower torque rod described above, to suppress transmission of the vibrations to the vehicle body. These insulators also suppress transmission of vibrations from a road surface to the vehicle body through the tires and the drive shafts. A Patent Literature 1 listed below discloses a pendulum type mount system that uses two lower torque rods. In the disclosure of the Patent Literature 1, the two torque rods control behavior of the powerplant unit during a frontal collision to protect a fuel filter located between the two torque rods.

PRIOR-ART LITERATURE

Patent Literature

Patent Literature 1: Japanese Patent Application Publication No. 2014-34319

SUMMARY OF INVENTION

Problem to be Solved by the Invention

In the pendulum type mount system disclosed in Patent Literature 1, its object is to improve collision safety by configuration of the lower torque rod, and nothing is disclosed about suppression of vibrations and noises caused by the vibrations of the internal combustion engine. An object of the present invention is to provide a pendulum type mount system that can reduce vibrations and noises by configuration of lower torque rods.

Means for Solving the Problem

An aspect of the present invention is a pendulum type mount system that includes a pair of upper mounts that mount upper portions of a powerplant unit on a vehicle body, and a pair of first and second lower torque rods. The first and second lower torque rods connect a lower portion of the powerplant unit with the vehicle body on a rear side of the powerplant unit. The first and second lower torque rods are located on opposite sides to each other with respect to a reference plane including a gravity center of the powerplant unit. A first spring constant of the first lower torque rod is not smaller than a second spring constant of the second lower torque rod. A distance between a first plane including the first lower torque rod and the reference plane is not larger than a distance between a second plane including the second lower torque rod and the reference plane.

Effect of the Invention

According to the aspect, it is possible to provide a pendulum type mount system that can suppress vibrations and noises by configuration of lower torque rods.

DESCRIPTION OF EMBODIMENTS

Figure 1:
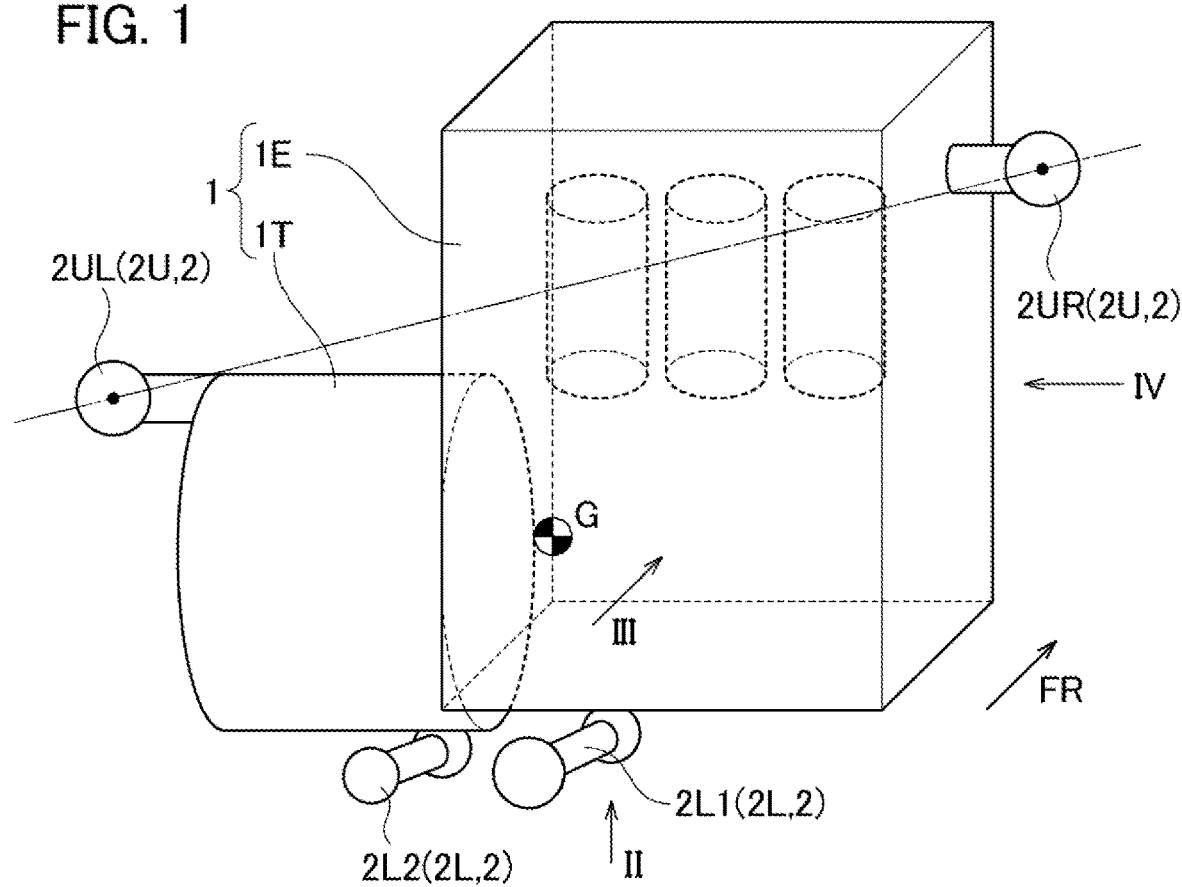
FIG. 1 is a schematic perspective view showing a pendulum type mount system according to an embodiment.
Figure 2:
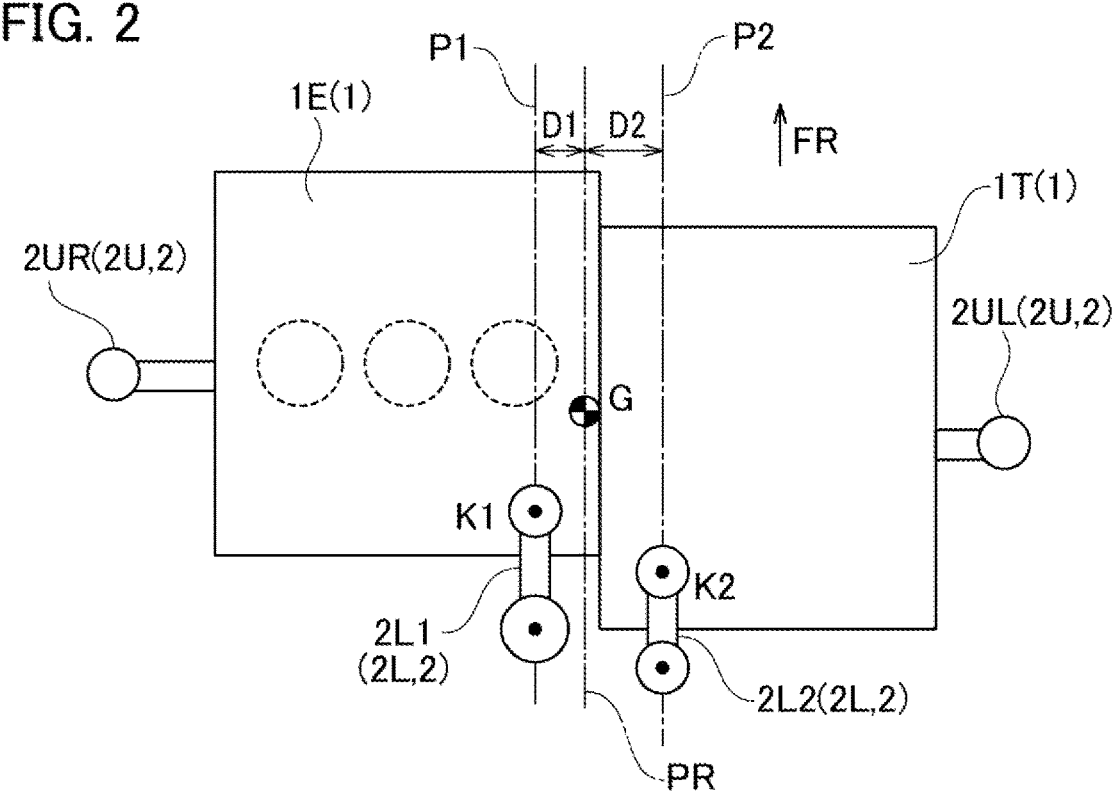
FIG. 2 is a schematic bottom view of the mount system.
Figure 3:
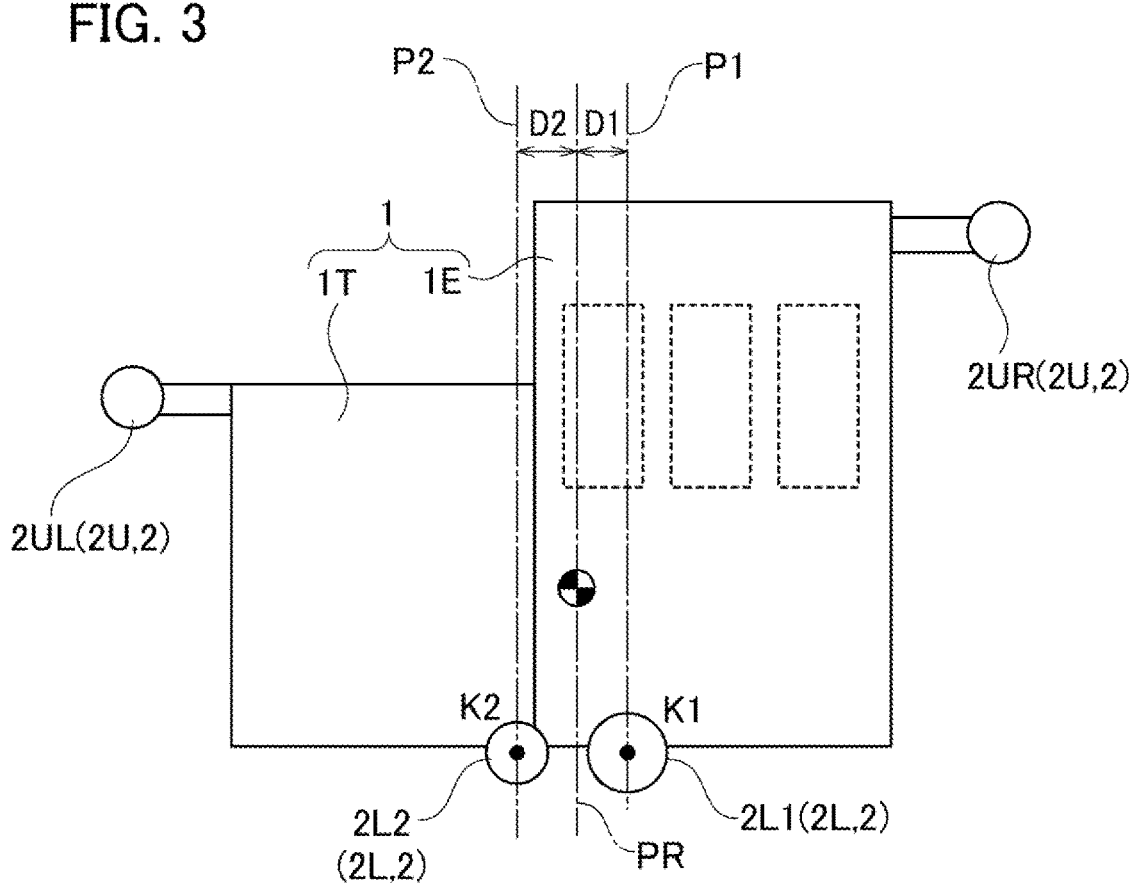
FIG. 3 is a schematic rear view of the mount system.
Figure 4:
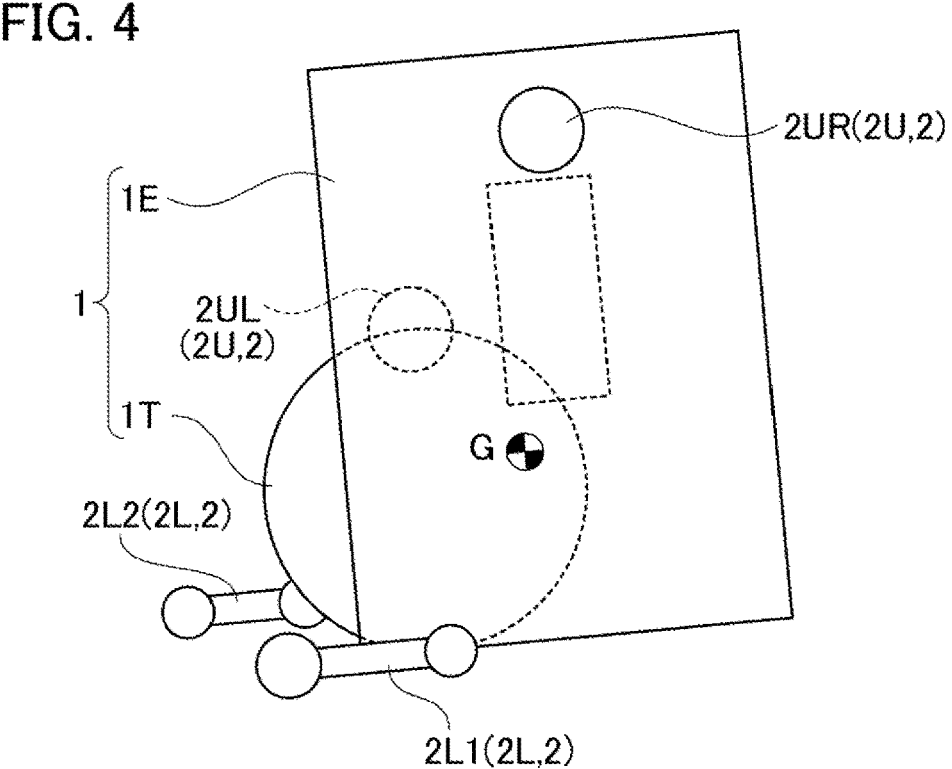
FIG. 4 is a schematic side view of the mount system.

Hereinafter, a pendulum type mount system according to an embodiment will be explained with reference to FIG. 1 to FIG. 7. Note that arrows FR in the drawings indicate a front of a vehicle body. In addition, FIG. 2 is a bottom view viewed along an arrow II in FIG. 1. FIG. 3 is a rear view viewed along an arrow III in FIG. 1. FIG. 4 is a side view viewed along an arrow IV in FIG. 1.

The mount system of the present embodiment is a system for mounting a powerplant unit 1 on the vehicle body. The powerplant unit 1 of the present embodiment is a unit that generates a drive force for driving a vehicle, and includes an internal combustion engine (hereinafter, simply called as the engine) 1E for generating the drive force for running the vehicle and a transmission 1T rigidly connected to the engine 1E. An engine block of the engine 1E and a case of the transmission 1T are rigidly connected with each other by bolts. The engine 1E is an inline three-cylinder transverse engine. The transmission 1T may be in various types, such as a manual transmission, an automatic transmission, a DCT, a CVT. An output end of a crankshaft of the engine 1E is coupled to an input end of the transmission 1T (a clutch may be interposed in between).

The powerplant unit 1 of the present embodiment is mounted in an engine compartment at a front section of the vehicle. The powerplant unit 1 drives front wheels (FWD) or four wheels (4WD). The powerplant unit 1 may include a gear unit, into which a final gear, differential gears and so on are integrally incorporated, and a transfer, which is integrally incorporated in a case of 4WD. The powerplant unit 1 may also include auxiliary components, such as an alternator and an air conditioning compressor, that are fixed to the powerplant unit 1. In addition, the transmission 1T may also include a reduction gear unit and a speed-up gear unit that do not perform gear changes. The powerplant unit 1 does not include engine mounts 2, such as upper mounts 2U and lower torque rods 2L explained later, nor drive shafts and a propeller shaft in a case of 4WD.

Although the powerplant unit 1 is supported by the vehicle body via the engine mounts 2 as explained above, a suspension member (subframe) is included in the vehicle body. The mount system in the present embodiment is of a pendulum type, and the powerplant unit 1 is mounted on the vehicle body so as to be hung down. The upper mounts 2U that mount upper portions of the powerplant unit 1 to the vehicle body are provided as the above-mentioned engine mounts 2. The upper mounts 2U are configured of an upper right mount 2UR that mounts an upper right portion of the powerplant unit 1 to the vehicle body, and an upper left mount 2UL that mounts an upper left portion of the powerplant unit 1 to the vehicle body. The powerplant unit 1 is mounted on the vehicle body by these upper mounts 2U so as to be hung down. In other words, a gravity center G of the powerplant unit 1 is located below a straight line passing through the pair of the upper mounts 2U (the upper right mount 2UR and the upper left mount 2UL).

The drive shafts are connected to the powerplant unit 1. Due to drive torques of tires and drive shafts, the powerplant unit 1 receives reactive torques that swing it about the upper mounts 2U as support points. When the vehicle accelerates or decelerates, the reactive torques act to move a lower portion of the powerplant unit 1 forward or backward. Therefore, in order to restrict the powerplant unit 1 from swinging caused by the reactive torques, provided are the lower torque rods 2L that connect the lower portion of the powerplant unit 1 with the vehicle body on a rear side of the powerplant unit 1.

In the present embodiment, a pair of a first lower torque rod 2L1 and a second lower torque rod 2L2 are provided as the lower torque rods 2L. That is, the engine mounts 2 also include the first lower torque rod 2L1 and the second lower torque rod 2L2. The first lower torque rod 2L1 and the second lower torque rod 2L2 are located on opposite sides to each other with respect to a reference plane PR.

The reference plane PR is a plane that includes the gravity center G of the powerplant unit 1 and is perpendicular to a lateral direction of the vehicle body. The first lower torque rod 2L1 and the second lower torque rod 2L2 extend parallel to the reference plane PR.

The engine 1E (the powerplant unit 1) is a source of vibrations due to combustions in its pistons cylinders, reciprocating motions of its pistons, rotational motions of its crankshaft and so on. Therefore, insulators are embedded in the engine mounts 2 (the upper mounts 2U and the lower torque rods 2L) to reduce the transmission of the vibrations to the vehicle body. As the insulators, there are a fluid-filled hydraulic type, a rubber type or the like (in the present embodiment, rubber insulators 24 and 27 explained later). Therefore, each of the lower torque rods 2L has a spring constant as it functions as an elastic member. The first lower torque rod 2L1 has a first spring constant K1, and the second lower torque rod 2L2 has a second spring constant K2. Here, the first spring constant K1 of the first lower torque rod 2L1 is not smaller than the second spring constant K2 of the second lower torque rod 2L2 (K1≥K2).

In the present embodiment, one end of the first lower torque rod 2L1 having the first spring constant K1 is attached to the lower portion of the engine 1E and the other end is attached to the vehicle body. Similarly, one end of the second lower torque rod 2L2 having the second spring constant K2 is attached to the lower portion of the transmission 1T and the other end is attached to the vehicle body. Note that no electronic control device that actively controls the vibrations is embedded in the engine mounts 2 in the present embodiment (the upper mounts 2U and the lower torque rods 2L).

Here, a plane that includes a connecting point of the first lower torque rod 2L1 with the powerplant unit 1 (the engine 1E) and is perpendicular to the lateral direction is denoted as a first plane P1. Similarly, a plane that includes a connecting point of the second lower torque rod 2L2 with the powerplant unit 1 (the transmission 1T) and is perpendicular to the lateral direction is denoted as a second plane P2. In addition, a distance D1 between the first plane P1 and the above-mentioned reference plane PR and a distance D2 between the second plane P2 and the reference plane PR are defined. In the present embodiment, the distance D1 is not larger than the distance D2 (D1≤D2).

Figure 5:
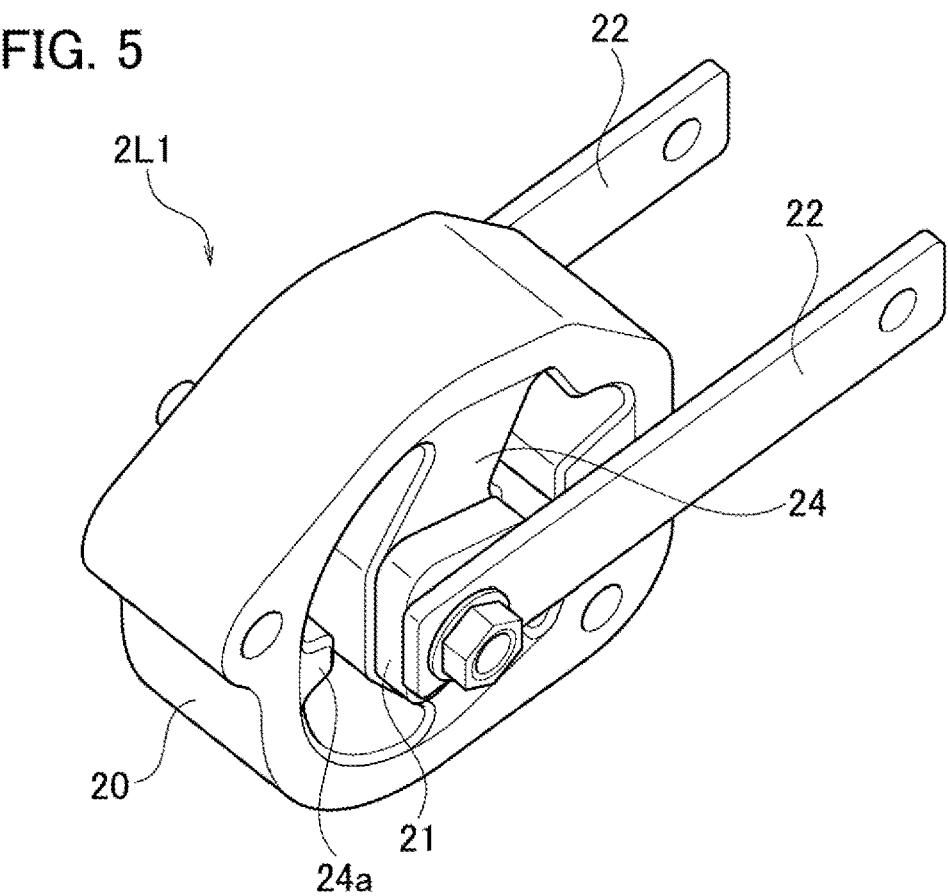
FIG. 5 is a perspective view of a first lower torque rod in the mount system.
Figure 6:
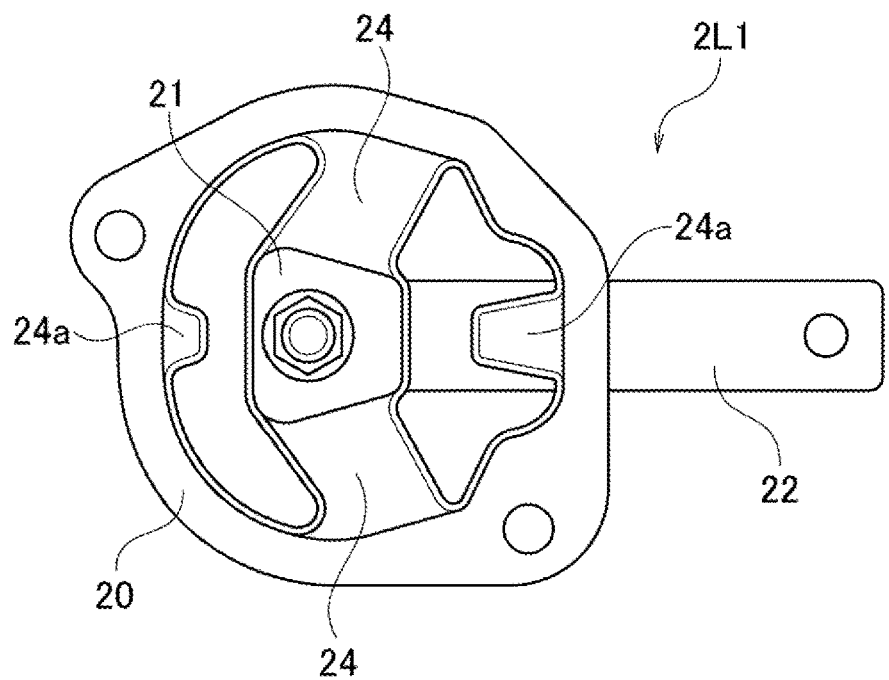
FIG. 6 is a side view of the first lower torque rod.

As shown in FIG. 5 and FIG. 6, the first lower torque rod 2L1 has a ring member 20 that is attached to the vehicle body and a pair of stays 22 that are attached to the powerplant unit 1. The ring member 20 and the stays 22 are made of metal. Note that the stay 22 located on a near side is not shown in FIG. 6. A core member 21 made of metal is placed at the center of the inside of the ring member 20, and the ring member 20 and the core member 21 are coupled with each other by a rubber insulator 24. One end of the stay(s) 22 is connected to the powerplant unit 1 (the engine 1E) vertically swingably, and the other end is connected to the core member 21 vertically swingably.

On a front side of the core member 21 (a right side in FIG. 6), a first rubber protrusion 24a protrudes rearward from an inner circumferential surface of the ring member 20. Also on a rear side of the core member 21 (a left side in FIG. 6), a second rubber protrusion 24a protrudes forward. The first and second rubber protrusions 24a are formed integrally with the rubber insulator 24. Rubber forming the rubber insulator 24 covers an entire of the inner circumferential surface of the ring member 20.

In a state where the powerplant unit 1 is stationary without swinging, a clearance is formed between the first rubber protrusion 24a and the inner circumferential surface of the ring member 20. Similarly, a clearance is formed between the second rubber protrusion 24a and the inner circumferential surface of the ring member 20. When the vehicle accelerates rapidly (starts running rapidly), the powerplant unit 1 receives the reactive torques from the drive shafts and thereby swings such that its lower portion moves forward with respect to the vehicle body. At this time, the core member 21 connected with the powerplant unit 1 by the stays 22 also moves forward and then contacts the first rubber protrusion 24a. As a result, a forward stroke of the lower portion of the powerplant unit 1 is restricted.

On the other hand, when the vehicle decelerates rapidly, the powerplant unit 1 receives the reactive torques from the drive shafts and thereby swings such that its lower portion moves rearward with respect to the vehicle body. At this time, the core member 21 connected with the powerplant unit 1 by the stays 22 also moves rearward and then contacts the second rubber protrusion 24a. As a result, a backward stroke of the lower portion of the powerplant unit 1 is restricted. In other words, the first and second rubber protrusions 24a function as stoppers that restrict the stroke of the lower portion of the powerplant unit 1 in a front-rear direction.

While the first or second rubber protrusion 24a elastically deforms after the start of the restriction of the swinging stroke, the spring constant of the first lower torque rod 2L1 becomes larger than the above-mentioned first spring constant K1. That is, vibrations that do not involve a stroke (amplitude) large enough to be restricted by the stopper(s) are suppressed by the first lower torque rod 2L1 with a relatively small first spring constant K1 (and the second lower torque rod 2L2). On the other hand, if the stroke becomes large due to the above-mentioned reactive torques, the spring constant is made larger than the first spring constant K1 by the stopper(s) and then vibration suppression degrades, but the maximum swinging stroke of the powerplant unit 1 swung by the reactive torques is reduced.

Figure 7:
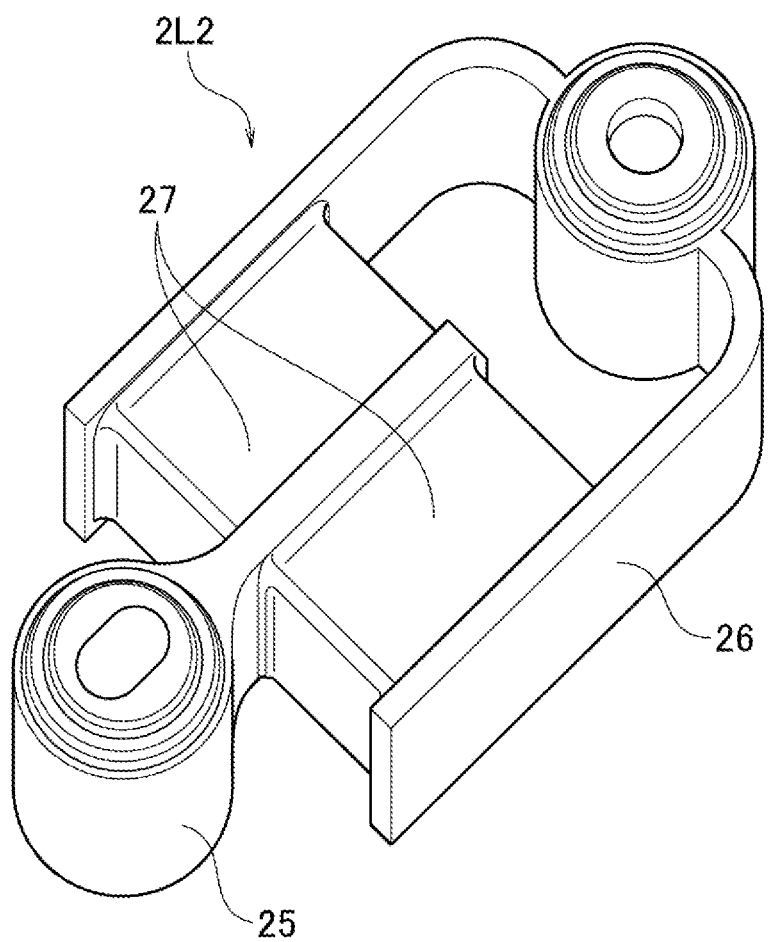
FIG. 7 is a perspective view of a second lower torque rod in the mount system.

As shown in FIG. 7, the second lower torque rod 2L2 includes a plate member 25 attached to the vehicle body and a U-shaped member 26 attached to the powerplant unit 1 (the transmission 1T). The plate member 25 and the U-shaped member 26 are made of metal. The plate member 25 is placed at the center of the inside of the U-shaped member 26, and the plate member 25 and the U-shaped member 26 are coupled with each other by rubber insulators 27. The plate member is connected to the vehicle body horizontally swingably, and the U-shaped member 26 is connected to the powerplant unit 1 horizontally swingably. The second lower torque rod 2L2 has no element like the above-mentioned stoppers of the first lower torque rod 2L1. Since the second lower torque rod 2L2 has no stopper, its spring constant maintains the above-mentioned second spring constant K2. Compared with a general pendulum type mount system consisting of only a single lower torque rod, the reactive torques from the drive shafts are distributed to the first lower torque rod 2L1 and the second lower torque rod 2L2 in the mount system according to the present embodiment and thereby the first spring constant K1 of the first lower torque rod 2L1 can be restricted from increasing. Therefore, the total spring constant composed of the parallel springs configured of the first spring constant K1 and the second spring constant K2 can be kept low, and then the vibration suppression can be efficiently brought even in the powerplant unit 1 with which large torques are generated in the drive shafts.

According to the present embodiment, the first lower torque rod 2L1 and the second lower torque rod 2L2 are located on opposite sides to each other with respect to the reference plane PR including the gravity center G of the powerplant unit 1. Further, (the first spring constant K1)≥ (the second spring constant K2) and (the distance D1 between the first surface P1 and the reference surface PR)≤(the distance D2 between the second surface P2 and the reference surface PR) are satisfied as explained above. In the present embodiment, instead of a single lower torque rod with a large spring constant, two of the first lower torque rod 2L1 and the second lower torque rod 2L2 each has a relatively small spring constant are provided. Therefore, each of the first lower torque rod 2L1 and the second lower torque rod 2L2 can effectively suppress vibrations and noises due to its small spring constant, i.e. the soft rubber insulators 24 and 27.

In addition, by providing the first lower torque rod 2L1 and the second lower torque rod 2L2 instead of a single lower torque rod, the respective sizes of the first lower torque rod 2L1 and the second lower torque rod 2L2 can be reduced. This prevents the first lower torque rod 2L1 and the second lower torque rod 2L2 from contacting with surrounding parts (e.g. transfer and so on) when the powerplant unit 1 swings (especially when its stroke is large), and thereby flexibility in layout design can be enhanced.

In other words, since the first lower torque rod 2L1 and the second lower torque rod 2L2 are less likely to contact with the surrounding parts, it is possible to extend the swinging stroke of the powerplant unit 1 by setting the first spring constant K1 and the second spring constant K2 smaller. Since the first spring constant K1 and the second spring constant K2 can be set smaller, it is possible to more effectively suppress the transmission of vibrations of the powerplant unit 1 to the vehicle body through the first lower torque rod 2L1 and the second lower torque rod 2L2.

Here in the present embodiment, as described above, the first lower torque rod 2L1 and the second lower torque rod 2L2 are located on opposite sides to each other with respect to the reference plane PR including the gravity center G, and K1≥K2 and D1≤D2 are satisfied. Therefore, the first lower torque rod 2L1 effectively acts on one side in the lateral direction with respect to the gravity center G (the reference plane PR), and at the same time, the second lower torque rod 2L2 effectively acts on the other side. As a result, the vibrations caused by the powerplant unit 1 can be made less transmitted to the vehicle body more effectively.

Further, K1≥K2 and D1≤D2 are satisfied, and thereby a relationship similar to a relationship of so-called leverage is established with respect to the gravity center G. Therefore, the vibrations of the powerplant unit 1 can be suppressed symmetrically with respect to the gravity center G in a balanced manner on the one side and the other side of the gravity center G (the reference plane PR).

In particular, the engine 1E in the present embodiment is an in-line three-cylinder transverse engine. Primary vibrations occur in engines having an odd number of cylinders, such as in-line three-cylinder engines and in-line five-cylinder engines. The primary vibrations are more pronounced in three-cylinder engines involving longer ignition intervals than in five-cylinder engines. The primary vibrations of the engine 1E generate precession vibrations of the powerplant unit 1 with respect to the gravity center G. Excitation forces due to the precession vibrations cause idle vibrations.

Here in the present embodiment, as described above, the first lower torque rod 2L1 and the second lower torque rod 2L2 are located on opposite sides to each other with respect to the reference plane PR including the gravity center G, and K1≥K2 and D1≤D2 are satisfied. Therefore, the vibrations due to the powerplant unit 1, which cause the idle vibrations, can be also made less transmitted to the vehicle body more effectively. Specifically, the precession vibrations that cause the idle vibrations have opposite phases on one side of the gravity center G (the reference plane PR) and on the other side. That is, the second lower torque rod 2L2 is compressed when the first lower torque rod 2L1 is pulled, and the precession vibrations are canceled mutually on both sides of the reference plane PR. As a result, the vibrations that cause the idle vibrations are canceled by themselves. Further, as described above, the relationship similar to a leverage relationship is established with respect to the gravity center G by K1≥K2 and D1≤D2. Therefore, the vibrations can be canceled more effectively. In particular, the excitation forces due to the precession vibrations may increase when enhancing an output torque in a three-cylinder inline engine, and thereby countermeasures against the idle vibrations are strongly desired. Therefore, the pendulum type mount system according to the present embodiment is very beneficial.

In addition, in the present embodiment, only the first lower torque rod 2L1 has the stopper(s) for restricting the swinging stroke of the lower portion of the powerplant unit 1 in the front-back direction. The second lower torque rod 2L2 has no stopper. In other words, the second spring constant K2 of the second lower torque rod 2L2 having no stopper can always suppress the vibrations effectively. Therefore, the noises caused by the vibrations of the powerplant unit 1 can be suppressed more effectively by the first lower torque rod 2L1 and the second lower torque rod 2L2.

Note that the present invention is not limited to the embodiment described above. For example, the powerplant unit in the present invention includes an internal combustion engine that inevitably becomes a source of vibrations, and the ICE (engine) 1E generates a drive force for running the vehicle in the above embodiment. The powerplant unit in the present invention may include a driving motor that generates a drive force for running a vehicle, and include an internal combustion engine that generates an electric power supplied to the drive motor (the drive motor and the internal combustion engine are rigidly connected with each other). In this case, an output power of the internal combustion engine may or may not be used as the drive power for running the vehicle. In other words, the powerplant unit of the present invention may also become a powerplant unit of a hybrid electric vehicle (HEV).

If a powerplant unit of an HEV (including a PHEV) has a power generation motor rigidly connected with the powerplant unit in addition to an internal combustion engine and a drive motor, the power generation motor may be also included in the powerplant unit. In addition, if a power control unit (PCU) that controls an HEV system is rigidly connected with a powerplant unit, the PCU may be also included in the powerplant unit. However, if the PCU is not rigidly connected to the powerplant unit and is only electrically connected by cables, it is not included in the powerplant unit. Further, if a battery electric vehicle (BEV) is provided with an internal combustion engine as a range extender, its drive motor and the internal combustion engine may be the powerplant unit of the present invention when the drive motor is rigidly connected with the internal combustion engine.

In addition, in the above embodiment, the first lower torque rod 2L1 having the stopper(s) is mounted on one side of the gravity center G in the lateral direction of the powerplant unit 1 (on the engine 1E), and the second lower torque rod 2L2 having no stopper is mounted on the other side (on the transmission 1T). However, the first lower torque rod 2L1 having the stopper(s) may be mounted on the other side in the lateral direction with respect to the gravity center G of the powerplant unit 1, and the second lower torque rod 2L2 may be mounted on the one side.

Further, in the above embodiment, the first lower torque rod 2L1 with the first spring constant K1 has the stopper(s) and the second lower torque rod 2L2 with the second spring constant K2 (≤K1) has no stopper. However, it is also possible that the first lower torque rod 2L1 with the first spring constant K1 has no stopper and the second lower torque rod 2L2 with the second spring constant K2 (≤K1) has the stopper(s). Also in these cases, if the above-mentioned relationship similar to a relationship of leverage (K1≥K2 and D1≤D2) is established with respect to the gravity center G, the vibrations of the powerplant unit 1 can be suppressed symmetrically and in a balanced manner on one side and the other side of the gravity center G (the reference plane PR).

Furthermore, in the above embodiment, the engine mount system is applied to the powerplant unit 1 including the in-line three-cylinder engine 1E. However, the present invention can be applied to engine mount systems for other engine types as well. In addition, the same advantages brought in the above-described inline three-cylinder engine can be obtained for inline five-cylinder engines as well as for inline three-cylinder engines. The metal members in the first lower torque rod 2L1 and the second lower torque rod 2L2 may be formed by synthetic resin.

REFERENCE SIGNS LIST

1 powerplant unit
1E internal combustion engine (engine)
1T transmission
2 engine mount(s)
2U upper mount(s)
2UR upper right mount
2UL upper left mount
2L lower torque rod(s)
2L1 first lower torque rod
2L2 second lower torque rod
24a rubber protrusion(s) (stopper(s))
K1 first spring constant (of the first lower torque rod 2L1)
K2 second spring constant (of the second lower torque rod 2L2)
G gravity center (of the powerplant unit 1)
PR reference plane
P1 first plane
P2 second plane
D1 distance (between the reference plane PR and the first plane P1)
D2 distance (between the reference plane PR and the second plane P2)

The invention claimed is:

1. A pendulum type mount system comprising:
   a powerplant unit that includes an internal combustion engine and generates a drive force for running a vehicle;
   an upper right mount that mounts an upper right portion of the powerplant unit on a vehicle body;
   an upper left mount that mounts an upper left portion of the powerplant unit on the vehicle body; and
   a pair of first and second lower torque rods that connect a lower portion of the powerplant unit with the vehicle body on a rear side of the powerplant unit,
   wherein the first and second lower torque rods are located on opposite sides to each other with respect to a reference plane that includes a gravity center of the powerplant unit and is perpendicular to a lateral direction of the vehicle body,
   wherein a first spring constant of the first lower torque rod is not smaller than a second spring constant of the second lower torque rod, and
   wherein, when a plane that includes a connecting point of the first lower torque rod with the powerplant unit and is perpendicular to the lateral direction is denoted as a first plane and a plane that includes a connecting point of the second lower torque rod with the powerplant unit and is perpendicular to the lateral direction is denoted as a second plane, a distance between the first plane and the reference plane is not larger than a distance between the second plane and the reference plane.

2. The pendulum type mount system according to claim 1, wherein the internal combustion engine is an inline three-cylinder transverse engine.

3. The pendulum type mount system according to claim 2, wherein only one of the first and second lower torque rods includes a stopper that restricts a swinging stroke of the lower portion of the powerplant unit in a front-rear direction of the vehicle body.

4. The pendulum type mount system according to claim 1, wherein only one of the first and second lower torque rods includes a stopper that restricts a swinging stroke of the lower portion of the powerplant unit in a front-rear direction of the vehicle body.

\* \* \* \* \*